United States Patent

[11] 3,561,450

[72] Inventor Robert L. Dahlquist
 Rock Island, Ill.
[21] Appl. No. 742,270
[22] Filed July 3, 1968
[45] Patented Feb. 9, 1971
[73] Assignee J. I. Case Company
 Racine, Wis.
 a corporation of Wisconsin

[54] COUNTERBALANCING MECHANISM FOR COMBINE
 12 Claims, 3 Drawing Figs.

[52] U.S. Cl. .................................................. 130/26
[51] Int. Cl. .................................................. A01f 12/30
[50] Field of Search .................................... 130/24, 25, 26, 27.85

[56] References Cited
UNITED STATES PATENTS
| | | | |
|---|---|---|---|
| 878,597 | 2/1908 | Anderson | 130/24 |
| 1,007,722 | 11/1911 | Meyer | 130/25 |
| 1,224,377 | 5/1917 | Hilger | 130/25 |
| 1,257,802 | 2/1918 | Butterworth | 130/27.16 |

Primary Examiner—Antonio F. Guida
Attorney—Settle, Batchelder and Oltman

ABSTRACT: A drive mechanism for a crop separator of a separating mechanism and including a shaft having a drive at one end thereof for reciprocating the separator with counterbalancing means connected to the opposite end of the shaft for absorbing shock loads supplied to the shaft. In the illustrated embodiment, the counterbalancing means includes a pair of springs telescoped on an extension arm pivoted to the shaft with the respective springs acting between a fixed stop on the mechanism and a stop on the extension.

PATENTED FEB 9 1971

3,561,450

INVENTOR.
ROBERT L. DAHLQUIST.
BY
SETTLE, BATCHELDER & OLTMAN.
ATT'YS.

3,561,450

COUNTERBALANCING MECHANISM FOR COMBINE

BACKGROUND OF THE INVENTION

The present invention relates generally to harvesting machines and more particularly to an improved drive mechanism for a crop separator forming part of the harvesting machine.

Conventionally, harvesting machines, commonly referred to as combines, cut the material to be harvested from a standing condition and pass it through a harvesting mechanism for separating the grain kernels from the remainder of the harvested material. In such a process, the harvested material is passed between a rapidly rotating cylinder and, what is commonly referred to, as a concave, to separate the kernels of grain from the remaining straw and heads. The majority of material is thereafter transferred to a racklike assembly, commonly referred to as a straw rack, and agitated and tossed violently to free the grain kernels from the mat of straw and allow the kernels to pass through openings in the straw rack for further processing.

Subsequently, the material falling through the openings in the straw rack is received on a cleaning shoe in which the chaff and trash are separated from the grain kernels and the chaff and trash are discarded through the rear end of the machine. Conventionally, the straw rack and cleaning shoe, as well as the return pan are driven by a single drive mechanism which includes a drive shaft connected adjacent one end of each of the respective members through links fixedly secured to the shaft and pivoted on the respective members. The opposite ends of the straw rack, return pan and cleaning shoe are pivoted through links to the main housing of the harvesting machine.

The drive mechanism for the drive shaft generally includes a fixed link connected to one end of the shaft with a pivoted link connected to the free end of the fixed link or lever while the opposite end of the pivoted lever is pivotally connected at an eccentric point to a pulley or equivalent drive mechanism rotated by the propulsion system for the vehicle. In this arrangement, the respective members are oscillated back and forth between predetermined limits to produce the agitation on the harvested materials supported thereon.

However, a serious drawback has been encountered in this type of arrangement. Thus, the pulley or other drive mechanism connected to the free end of the link is generally rotated at a speed of approximately 250 revolutions per minute to drive the shaft, commonly referred to as the rocker shaft, causing the straw rack, cleaning shoe and return pan to oscillate. During this oscillation, inertia forces caused by starting and stopping of the mass including the straw rack, cleaning shoe and return pan are transmitted to the rocker shaft through the links or arms supporting the respective elements on the shaft.

The inertia forces generated by the starting and stopping of this mass are transmitted from the free end of the rocker shaft through the connecting link, and through the rocker shaft into the extension arm. The particular forces transmitted to the rocker shaft caused a considerable torque force to be applied to the shaft particularly at the free end thereof. This has heretofore necessitated making all of the elements of the drive mechanism of considerable size and weight to accommodate torsional forces applied to the shaft as well as the forces applied to the remaining portion of the drive mechanism.

SUMMARY OF THE INVENTION

The present invention alleviates all of the foregoing problems by incorporating a counterbalancing or shock absorbing means associated with the drive or rocker shaft to absorb the torque forces and/or shock loads applied to the drive means during the reversal of movement of the straw rack and the remaining elements of the crop separating mechanism.

Thus, the primary object of the present invention is to provide shock absorbing means within the drive mechanism of a crop separating member to accommodate shock forces resulting from reversal of direction of the crop separating member during its reciprocating movement.

Another object of the invention is to provide the counterbalancing means incorporated in a drive mechanism for a crop separating member which reduces torque forces applied to the driving mechanism.

A further object is to provide a drive mechanism for a crop separating member incorporating counterbalancing springs which accommodate inertia forces produced in the drive mechanism and which aids the conventional drive mechanism in reciprocating the crop separating member.

Other objects of this invention will appear in the following description and appended claims, reference being had to the accompanying drawings forming a part of this specification wherein like reference characters designate corresponding parts in the several views.

DETAILED DESCRIPTION OF DRAWINGS

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
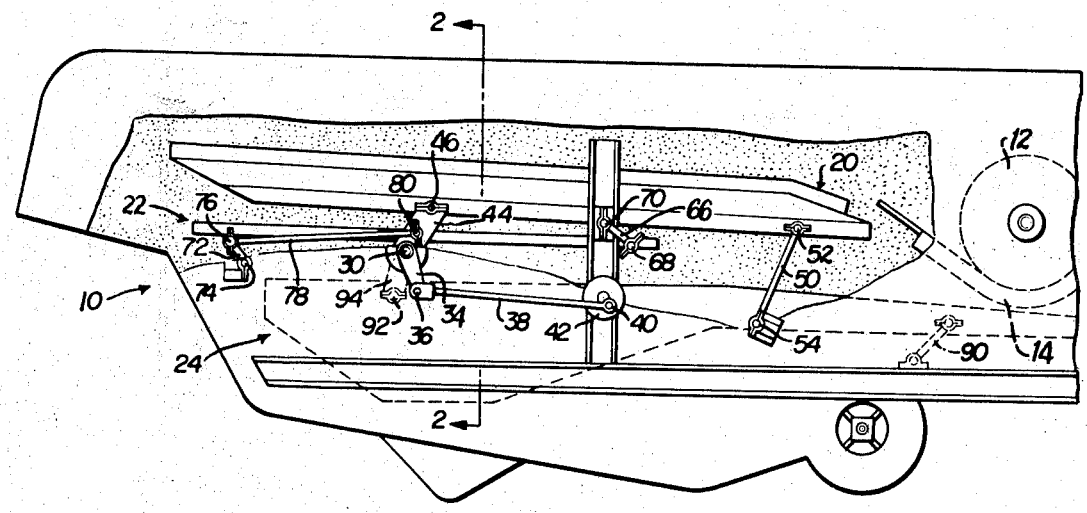
FIG. 1 is a side elevational view with parts thereof broken away of a harvesting vehicle or mechanism having the present invention incorporated therein.

The harvesting mechanism incorporating the present invention is generally shown in FIG. 1 and includes a housing generally designated at 10, which may be termed a crop treating housing. Conventionally, a cylinder 12 is rotated in suitable bearings in the housing adjacent a concave 14 to separate the harvested material and deliver most of the harvested material to a straw rack generally designated at 20.

The material falling through the straw rack is gathered on a straw rack return pan 22 and delivered to a combination grain pan and cleaning shoe 24. Conventionally the straw rack, straw rack return pan, and cleaning shoe are driven in a well known manner to agitate and toss the material lying thereon in a manner to separate the smaller, heavier grain kernels from the remaining harvested material.

For this purpose, the harvesting mechanism generally includes a drive mechanism including a drive shaft 30 journaled in suitable bearing 32 carried by the housing 10. The drive for drive shaft or rocker shaft 30 includes an arm 34 fixedly secured to one end of the shaft and having a pivotal connection on the free end thereof at 36 with a drive rod or link 38. The opposite end of the link 38 is pivotally connected at an eccentric point 40 to a drive pulley 42 conventionally driven by the power source for the vehicle (not shown). Thus, during rotation of the drive pulley 42, the arm 34 is driven between predetermined opposed limits along an arcuate path to violently oscillate or reciprocate the straw rack, straw rack return pan, and the cleaning shoe in a manner to be described hereinafter.

The drive shaft or rocker shaft 30 has a pair of arms or links 44 fixedly secured thereto with the free ends of the arms pivotally connected at 46 adjacent one end of the straw rack 20. The opposite end of the straw rack 20 has one end of a pair of links 50 pivoted at 52 to the straw rack. The opposite end of the respective links 50 are pivoted at 54 to the harvesting or combine housing 10. Thus, it can be appreciated that the eccentric or pulley 42 will oscillate or reciprocate the straw rack 20 forwardly and rearwardly within the housing 10 defining a crop separating passage.

Likewise, the grain return pan has its forward end pivoted to the housing 10 through links 66 having their opposite ends 68 and 70 respectively pivoted on the return pan 22 and the housing 10. The rear or opposite end of the return pan 22 likewise is pivotally supported by links 72 each having one end pivotally connected at 74 to the housing while the opposite end is pivotally connected at 76 to the return pan. A second rod or shaft 78 has one end pivotally connected at 76 to the return pan while the opposite end is connected at 80 to one of the arms 44 so that the straw rack return pan is conventionally driven simultaneously with the straw rack.

The cleaning shoe 24 is also driven by the same drive mechanism and for this purpose, is pivotally connected at its forward end through links 90 to the housing frame. The rear end of the cleaning shoe 24 has pivotal connections at 92 to spaced arms 94, the opposite end of the respective arms being fixed on the shaft 30.

All of the mechanism thus far described is of course conventional in any harvesting machine or combine and thus it is believed that a detailed description thereof is not necessary. Suffice it to say that as the rocker shaft 30 is rotated between predetermined limits, the straw rack, straw rack return pan, and cleaning shoe are oscillated fore-and-aft of the longitudinal passage defined by the housing 10.

Due to the large mass of the straw rack as well as the straw rack return pan and the cleaning shoe, considerable inertia forces are transmitted to the drive shaft or rocker shaft 30 during the reversal of direction of the respective elements. This of course produces extreme shock loads or forces in the drive mechanism for the crop separator. As was explained hereinabove, these shock forces are particularly objectionable adjacent the end of the drive shaft 30 based from the fixed arm 34. Thus, as was explained hereinabove, the forces on the free end of the shaft are transmitted from the respective elements through the rocker arms and through the drive shaft into the drive mechanism including rod 38. This of course is highly objectionable since it causes undue wear and vibration in the entire drive mechanism. Furthermore, and even more importantly, the forces particularly adjacent the free end of the drive shaft cause a torsional stress in the shaft necessitating a large, heavy and expensive drive shaft forming part of the drive mechanism for the crop separator.

According to the present invention, the inertia forces produced by the crop separator which are reflected into the drive are materially reduced by providing a counterbalancing or shock absorbing mechanism adjacent the nondriving end of the shaft. This mechanism is not only reduces the shock forces transmitted to the drive shaft thereby reducing the torsional stress within the drive shaft, but also assists or aids the drive mechanism in reciprocating the crop separator, as will become apparent hereinafter.

Figure 2:
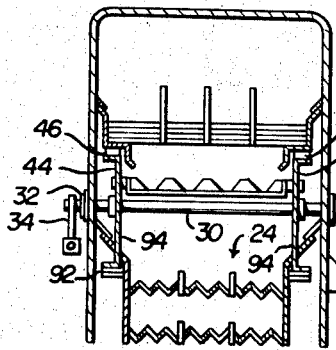
FIG. 2 is a vertical sectional view taken generally along lines 2-2 of FIG. 1.
Figure 3:
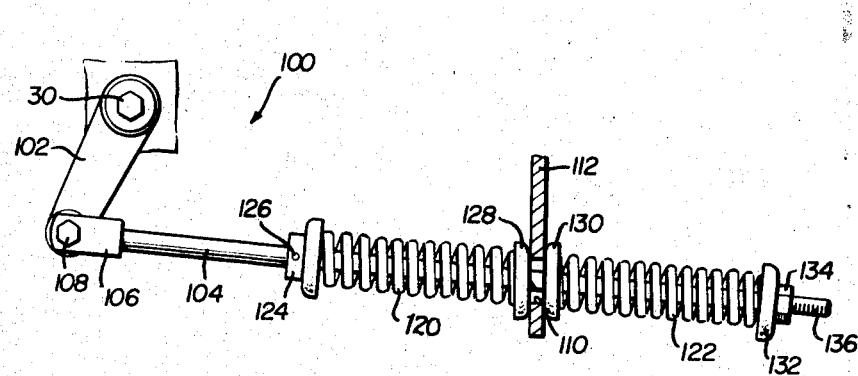
FIG. 3 is an enlarged fragmentary side elevational view of the mechanism of the present invention.

The counterbalancing or shock absorbing mechanism 100 is shown in FIGS. 2 and 3. The mechanism 100 includes an arm or lever 102 fixedly secured to the nondriving end of the drive or rocker shaft 30. The free end of the arm 102 pivotally supports one end of a rod or extension 104 through a clevis 106 and a pin 108. The opposite end of the rod or extension 104 is passed through an enlarged opening 110 formed in a bracket 112 fixedly secured to the outer surface of the housing 10.

Counterbalancing means are formed on the extension 104 and are illustratively disclosed as a pair of compression springs 120 and 122 respectively telescoped on the extension 104. The spring 120 has one free end thereof in engagement with an adjustable stop 124 adjustably secured to the rod 104 through setscrews 126. The opposite end of compression spring 120 is received in a hub 128 engaging one surface of the fixed stop 112.

Likewise, spring 122 has one end in engagement with a hub 130 engaging the opposed surface fixed bracket 112 while the opposite end is in engagement with a hub 132 slidable on the rod or shaft 104. The hub 132 has its free surface in engagement with a nut 134 received on a threaded portion 136 of the rod 104.

Thus, it is readily apparent, that the opposed forces of the respective springs 120 and 122 will tend to maintain the arm 102, as well as arm 34, in a position intermediate the opposite extreme position of rock shaft 30. As the rocker shaft 30 is driven by arms 34 and the appropriate spring 120 or 122 will be further compressed thereby increasing the force tending to move the drive shaft 30 to the intermediate position. The inertia forces generated on the nondriving end of the rocker shaft 30 are thus absorbed by the compression springs 120 and 122 and the additional forces applied by the respective springs will aid in driving the entire crop separator.

It will readily be appreciated the counterbalancing forces produced by the respective spring 120 and 122 will substantially eliminate all of the torsional stress forces applied by the mass of the crop separator to the nondriving end of the rocker shaft during its fore-and-aft oscillating movement.

Thus, the drive mechanism for the crop separator having the counterbalancing means of the present invention results in the following advantages:

1. The peak loads on the drive including the arm 34 and drive rod 38 are reduced by approximately 50 percent allowing lighter components and/or increased life.

2. The torque forces transmitted through the drive side of the rockershaft are reduced by approximately 50 percent, these forces being absorbed by the counterbalancing springs 120 and 122 on the nondriving end of the rockershaft. This again allows the manufacturer to use lighter components for the drive mechanism and at the same time increases the service life of the drive mechanism.

3. The torsional stresses within the rockershaft, particularly at the nondriving end of the rockershaft, are reduced to a minimum again allowing use of a lighter shaft and reducing torsional stresses within the crop separator caused by the relative displacement of the respective arms 44 driving the crop separator. This feature again allows the use of lighter materials for the drive mechanism.

4. Machine vibration is considerably reduced due to the balancing forces applied by the springs 120 and 122 causing a reduction in the force transmitted through the drive rod 38 to the housing 10. Of course the counterbalancing springs 120 and 122 will equalize the inertia forces on the opposite end of the rockershaft thereby further decreasing the machine vibration during the operation.

I claim:

1. In a harvesting machine of the type having a crop separator operatively mounted in a passage defined by a frame with a drive mechanism connected to said separator for moving said separator generally fore-and-aft in said passage, including a rocker shaft operable for rotation between predetermined angular limits defining an included angle of less than 360°, the improvement of means forming a part of said drive mechanism and coacting with said rocker shaft for absorbing inertia forces generated in said drive mechanism during reversal of direction of movement of said separator; said means tending to maintain said rocker shaft in a position intermediate said limits.

2. A harvesting machine as defined in claim 1 in which said last means comprises biasing means operatively connected to said drive mechanism.

3. A harvesting machine as defined in claim 1 wherein said rocker shaft is journaled on said frame with drive means on one end of said shaft, the further improvement of said last means operatively interposed between the opposite end of said shaft and said frame.

4. A harvesting mechanism as defined in claim 3, including the further improvement of said last means comprising an extension on said opposite end of said shaft, spaced stops on said extension, a fixed stop supported on said frame and disposed intermediate said spaced extension stops and biasing means between each of said spaced stops and said fixed stop.

5. A harvesting mechanism as defined in claim 4 in which said biasing means comprises a pair of springs each having one end in engagement with one of said spaced stops and the opposite end in engagement with said fixed stop.

6. A drive mechanism for reciprocating a straw rack longitudinally within a housing of a crop separating mechanism comprising a shaft rotatable on said housing and operatively connected to said straw rack and drive means connected to said shaft for rotating said shaft and reciprocating said straw rack, the improvement of biasing means acting in opposition to each other and means connected to said shaft for absorbing torsional stresses produced in said shaft during reciprocation of said straw rack.

7. A drive mechanism as defined in claim 6, wherein said drive means comprises a drive lever connected to one end of said shaft and having a driving connection at one end to a drive member, the further improvement of said last means comprising a driven lever fixed to the opposite end of said shaft and said biasing means acting on said lever.

8. A drive mechanism as defined in claim 7, in which said biasing means includes a fixed stop on said frame spaced from said driven lever, and an extension on said driven lever and extending through and beyond said fixed stop, a pair of springs telescoped on said extension on opposite sides of said fixed stop and each having one end in engagement with fixed stop, and adjustable stops on said extension and respectively engaged by one of said springs.

9. In a crop separating mechanism having a straw rack arranged longitudinally in a housing, means pivotally supported one end of said straw rack in said housing for generally fore-and-aft reciprocating movement, and driving means adjacent the opposite end of said straw rack for producing said fore-and-aft movement, the improvement of counterbalancing means acting in opposition to each other incorporated in said driving means and said housing for absorbing shock loads in said drive means resulting from reversal of direction of said straw rack during said reciprocating movement.

10. A crop separating mechanism as defined in claim 9, wherein said drive means includes a shaft rotatably supported by said housing, spaced links each having one end fixed to said shaft and the opposite end pivoted to said opposite end of said straw rack, and a driven member connected to one end of said shaft, the further improvement of said counterbalancing means operatively connected to said opposite end of said shaft and including biasing means interposed between said shaft and said housing.

11. A crop separating mechanism as defined in claim 10, in which said biasing means includes a rod pivotally connected to said shaft and having a stop thereon, a fixed stop on said housing and slidably receiving said rod and a spring telescoped on said rod and having opposite ends in engagement with said stops.

12. A crop separating mechanism as defined in claim 11, in which said biasing means further includes a second spring telescoped on said rod and having one end engaging said fixed stop and a second stop on said rod with the opposite end of said second spring engaging said second stop.